United States Patent
Faedo et al.

(10) Patent No.: US 12,483,165 B2
(45) Date of Patent: Nov. 25, 2025

(54) MONITORING AND REMEDIATION PROCESS AND SYSTEM FOR AN ELECTRIC MOTOR

(71) Applicant: DANA TM4 ITALIA S.R.L., Vicenza (IT)

(72) Inventors: Walter Faedo, Vestenanova (IT); Riccardo Bicego, Castelgomberto (IT)

(73) Assignee: DANA TM4 ITALIA S.R.L., Arzignano (IT)

( * ) Notice: Subject to any disclaimer, the term of this patent is extended or adjusted under 35 U.S.C. 154(b) by 186 days.

(21) Appl. No.: 18/054,047

(22) Filed: Nov. 9, 2022

(65) Prior Publication Data
US 2024/0154548 A1    May 9, 2024

(51) Int. Cl.
*H02P 6/18* (2016.01)
*H02K 1/2781* (2022.01)

(52) U.S. Cl.
CPC ............ *H02P 6/18* (2013.01); *H02K 1/2781* (2022.01); *H02K 2201/03* (2013.01)

(58) Field of Classification Search
CPC ........ H02P 6/18; H02P 2203/03; H02P 27/06; H02K 1/2781; H02K 2201/03
See application file for complete search history.

(56) References Cited

U.S. PATENT DOCUMENTS

| | | | | |
|---|---|---|---|---|
| 6,005,364 A * | 12/1999 | Acarnley | ................ | H02P 6/18 318/632 |
| 6,989,668 B2 * | 1/2006 | Mayes | ................ | H02P 6/18 318/254.1 |
| 7,095,205 B2 * | 8/2006 | Ehsani | ................ | H02P 25/089 318/254.1 |
| 7,800,256 B2 * | 9/2010 | Jajtic | ................ | H02K 19/103 310/49.39 |
| 7,816,822 B2 * | 10/2010 | Nashiki | ................ | H02K 1/2773 310/257 |
| 8,330,404 B2 * | 12/2012 | Sakai | ................ | H02P 21/22 318/400.3 |
| 11,289,960 B2 | 3/2022 | Ohori et al. | | |
| 2005/0035678 A1 * | 2/2005 | Ward | ................ | H02P 21/06 310/268 |

(Continued)

FOREIGN PATENT DOCUMENTS

| JP | 5869592 B2 | 2/2016 |
|---|---|---|
| JP | 2016042763 A | 3/2016 |

*Primary Examiner* — Rina I Duda
(74) *Attorney, Agent, or Firm* — McCoy Russell LLP

(57) ABSTRACT

Methods and systems are disclosed for monitoring rotor flux linkage of a rotor via a monitoring mode and resetting rotor flux linkage of the rotor via a resetting mode. As one example, monitoring rotor flux linkage includes measuring rotor flux linkage generated by rotor magnets at an air gap of the motor continuously during run-time via a plurality of models and various system components. As another example, resetting rotor flux linkage includes ensuring motor movement ceases and injecting a positive pulse d-axis current for a plurality of motor pole pairs in response to rotor flux linkage not being within a pre-determined threshold. In this way, magnets with low remanent flux density and low coercivity may be utilized in various embodiments of electric motors, reducing design complexity of a rotor of an electric motor, and in turn, reducing production costs.

16 Claims, 6 Drawing Sheets

(56) References Cited

U.S. PATENT DOCUMENTS

| | | | | |
|---|---|---|---|---|
| 2010/0060223 A1* | 3/2010 | Sakai | ............. | H02K 1/2766 |
| | | | | 310/156.01 |
| 2016/0091568 A1* | 3/2016 | Weber | ............. | G01R 31/343 |
| | | | | 318/490 |

* cited by examiner

MONITORING AND REMEDIATION PROCESS AND SYSTEM FOR AN ELECTRIC MOTOR

TECHNICAL FIELD

The present disclosure relates generally to systems and methods for electric motor diagnostics and remediation.

BACKGROUND AND SUMMARY

Electric motor performance may be increased by monitoring rotor flux linkage of electric motors with soft magnets. Instructions configured, stored, and executed in a computing device that are compliant with applicable standards may be used to monitor rotor flux linkage, detect magnet degradation or demagnetization of an electric rotor, and implement remediation measures to reset rotor flux linkage. In this way, disadvantages of soft magnets, such as low remanent flux density and low coercivity, at different operating conditions may be addressed to reduce the frequency of demagnetization of rotor magnets and the resultant reductions in rotor flux linkage that may result in degradation of overall motor performance.

U.S. Pat. No. 11,289,960 to Ohori et al. discloses a rotor system configuration to reduce inductance and suppress the demagnetizing field. The system includes ferrite magnets that are disposed on an outer peripheral surface of a rotor core and the radial thickness of both sides of the magnet at the end portions of the magnet are smaller in a circumferential direction around the axis than a radial thickness at a circumferential intermediate portion. Additionally, salient poles that protrude radially outward from the end portions of magnets in the circumferential direction are formed between magnets adjacent in the circumferential direction of the outer peripheral surface of the rotor core. The electrical angles of the salient poles may be strategically set to 400 or less. By implementing the aforementioned configuration, the inductance in the d-axis direction and q-axis direction may be reduced and the magnetic fluxes are concentrated on the salient poles which may prevent the demagnetizing field from acting on the end portions of the ferrite magnets.

The disclosure discussed above relies on arrangement of the rotor and the rotor magnets with a complex design to mitigate a demagnetization effect of the rotor magnets. However, complex designs of a rotor may be more difficult to manufacture and may be more expensive to manufacture than more simple designs prone to the demagnetization effect.

The inventors herein have recognized the above issues and provide approaches to at least partially address them, including monitoring rotor flux linkage of the rotor via a monitoring mode and resetting rotor flux linkage of the rotor in response to rotor flux linkage not being within a predetermined threshold via a resetting mode.

In this way, the disclosure may be implemented in software of an inverter that controls the motor. Such an approach may be less stringent in terms of computation capability, which may allow for simpler designs of a rotor and may reduce manufacturing costs. Additionally, the disclosure may be executed automatically without movement of the rotor when demagnetization may lead to degradation effects in terms of vehicle performance. As such, the functionality of the system may not be reduced and the disclosure may be performed without intervention by a user.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

The methods and systems described herein relate to a structure for increasing the reliability and control of monitoring a rotor of a vehicle by communicatively coupling instructions stored in at least one memory of at least one electronic device and the rotor. In particular, systems and methods are provided for monitoring the rotor and implementing remediation measures via instructions stored and executed in at least one of the electronic device, such as an inverter, or to increase operability of a rotor of the motor. In this way, the efficiency of the motor may increase, which improves real-time processing performance and monitoring, and the frequency of operating a vehicle with system degradation may decrease.

Figure 1:
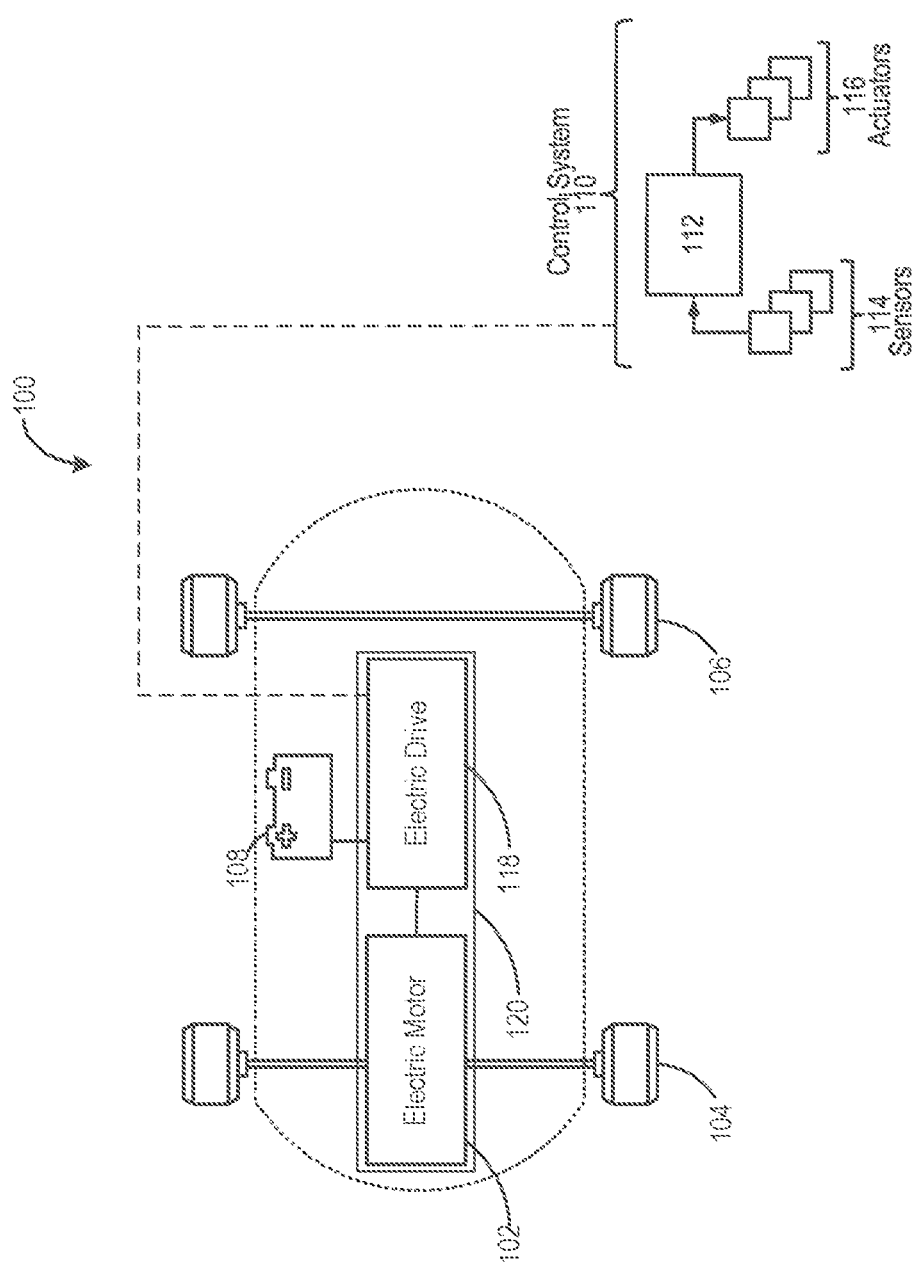
FIG. 1 illustrates a schematic of a control system and a vehicle including an electric motor.
Figure 2:
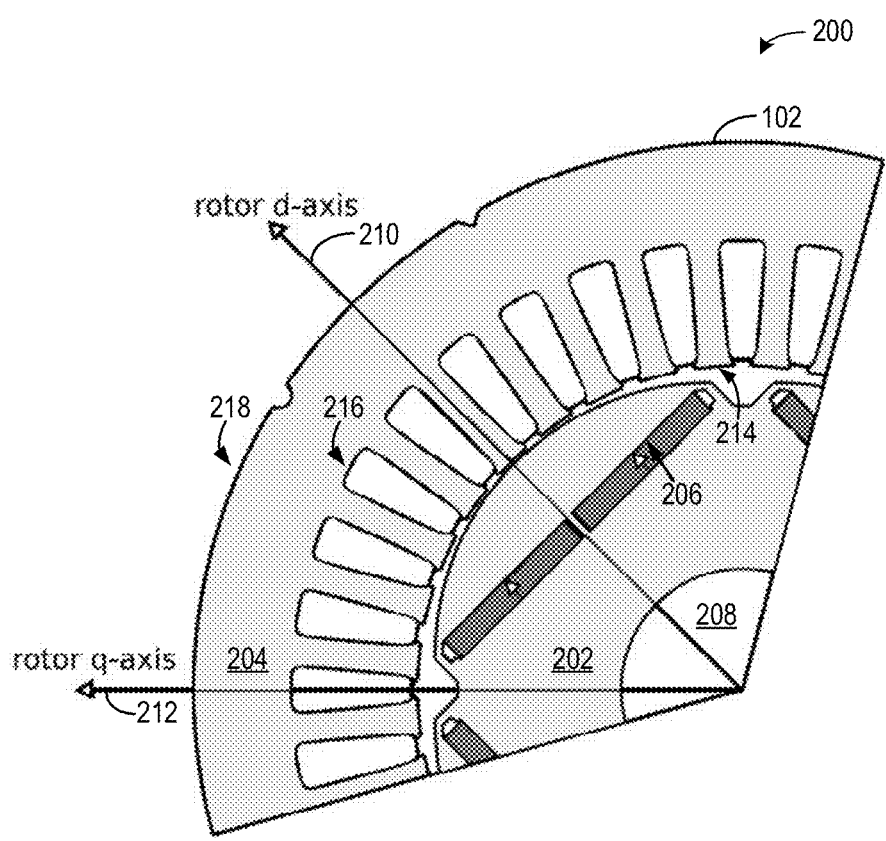
FIG. 2 illustrates a motor and rotation system of an electric motor.
Figure 3A:
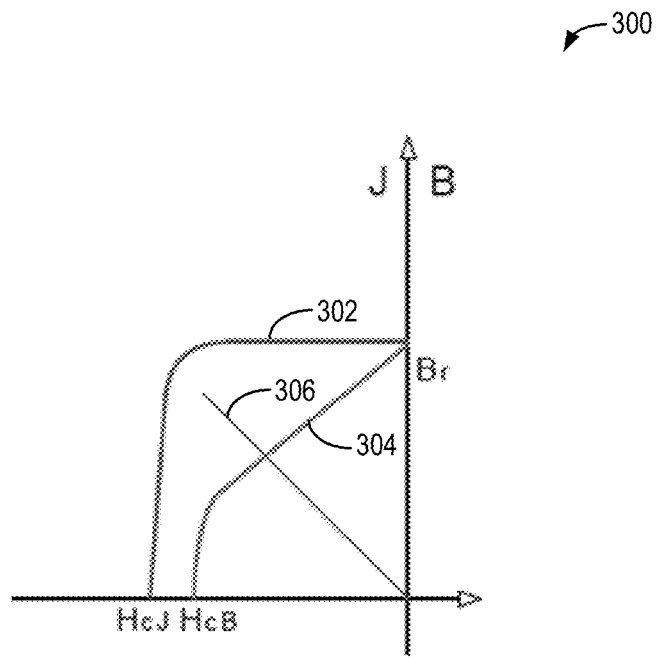
FIG. 3A and FIG. 3B is a schematic representation of magnetic flux density and polarization with respect to an externally applied magnetic field strength during an operating condition of an electric motor.
Figure 3B:
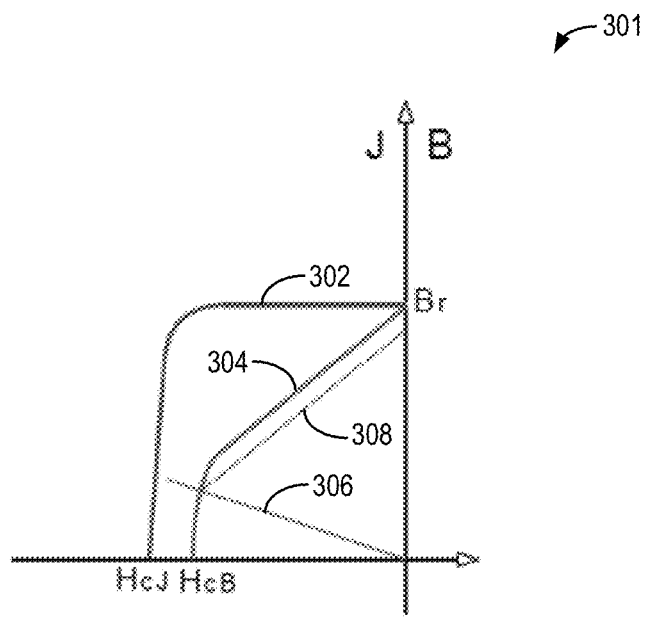
Figure 4:
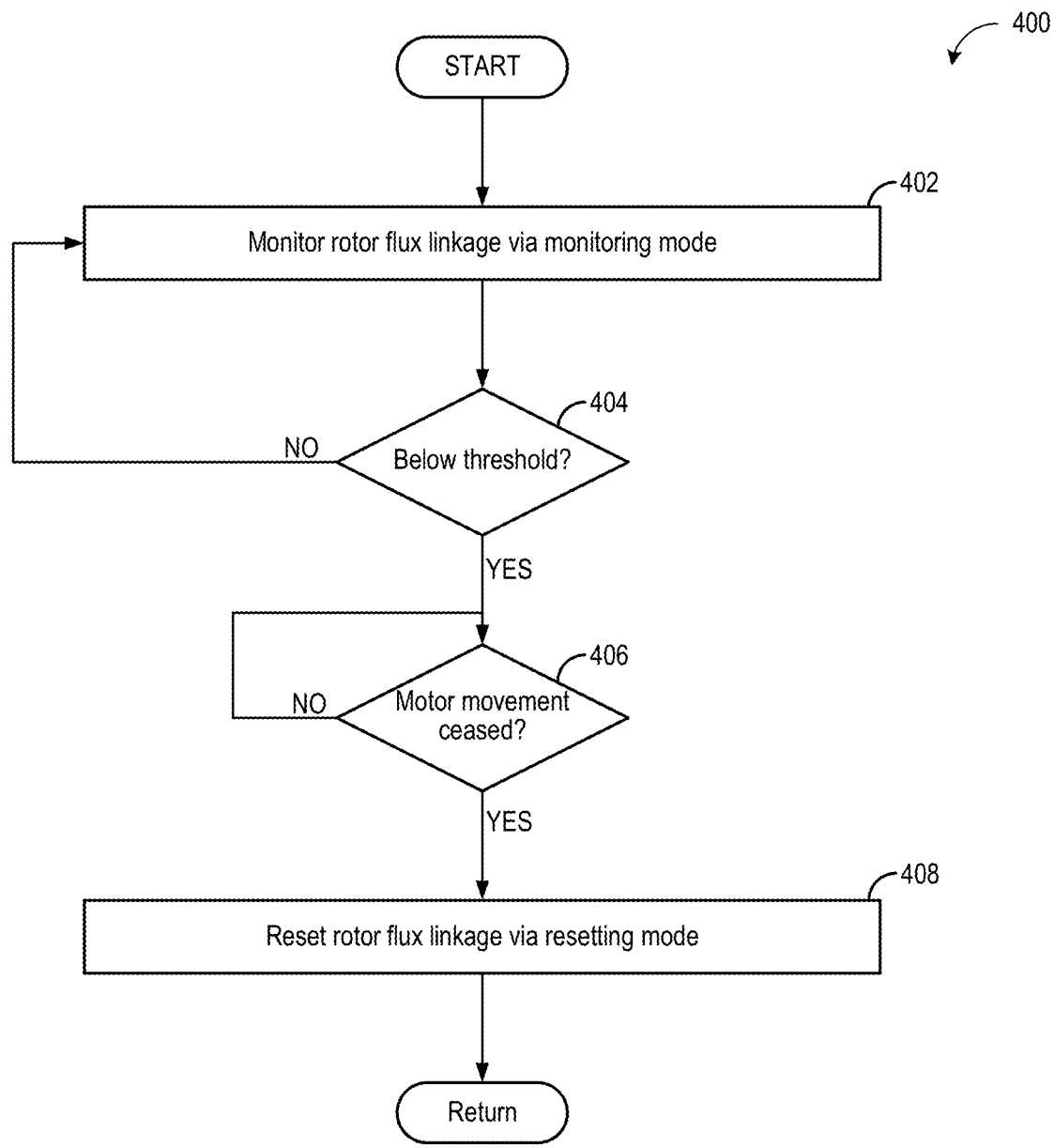
FIG. 4 is a flow diagram representation of a method for controlling rotor flux linkage of a rotor of an electric motor.
Figure 5:
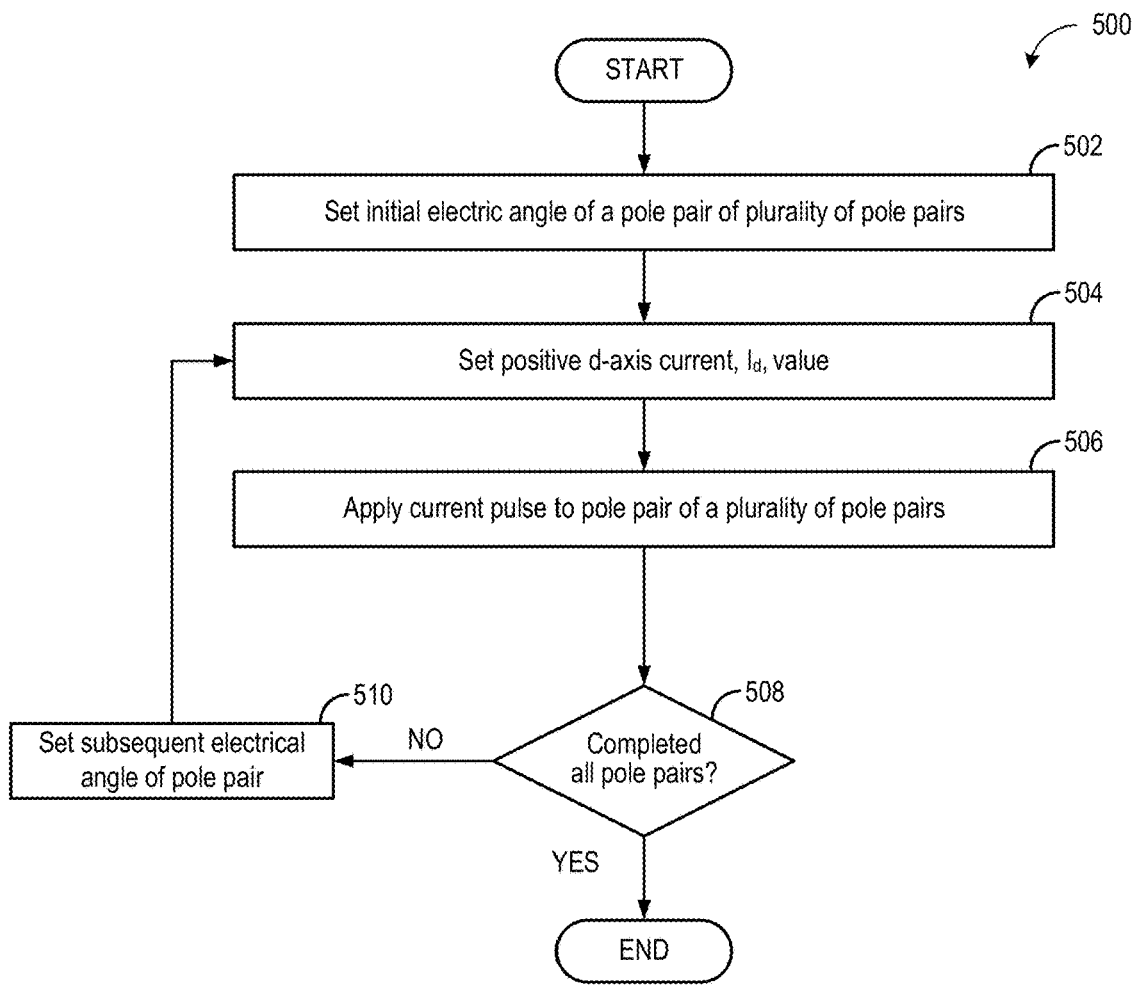
FIG. 5 is a flow diagram representation of a method for resetting rotor flux linkage in a rotor of an electric motor.
Figure 6:
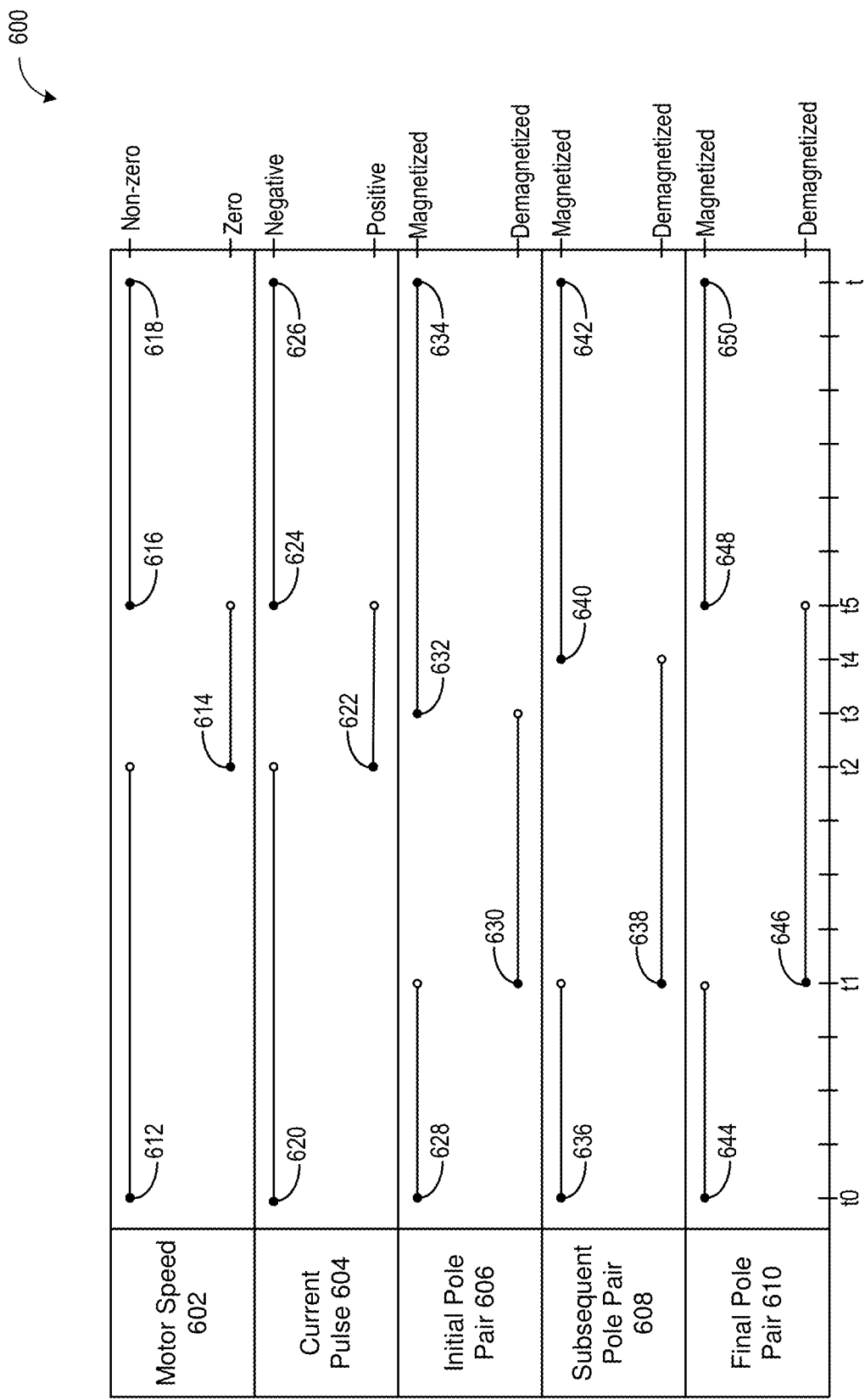
FIG. 6 is a timing diagram illustrating the timing sequence of a monitoring mode and resetting mode.

A vehicle system, including an electric motor, that communicatively couples various components of the vehicle system is shown in FIG. 1. FIG. 2 illustrates an electric motor and various components of the electric motor. As shown in FIG. 3A and FIG. 3B, operating conditions wherein a plurality of magnets of a rotor operate with and without demagnetization of the plurality of magnets. A method that monitors rotor flux linkage and implements remediation parameters in response to undesirable rotor flux linkage values is shown in FIG. 4. FIG. 5 describes a method for implementing remediation measures by resetting rotor flux linkage of the rotor. As shown in FIG. 6, a timing diagram illustrating changes in various parameters of the rotor over time.

FIG. 1 shows a schematic depiction of a vehicle system 100. The vehicle system 100 may include rear vehicle wheels 104, front vehicle wheels 106, a traction battery 108, and an electric drive system 120. The electric drive system 120 may include an electric motor 102 and an electric drive 118 electrically coupled to the electric motor 102. The electric drive 118 may include an inverter communicatively coupled to a control system 110 to control speed and torque of the electric motor 102. The inverter may be electrically coupled to an electrical power source wherein executable instructions are configured, stored, and executed in at least one memory by at least one processor of the inverter to monitor rotor flux linkage via a monitoring mode and to magnetize a plurality of pole pairs via a resetting mode of the electric motor 102.

The control system 110 may include a controller 112 of a plurality of controllers that is communicatively coupled to a plurality of sensors 114 and a plurality of actuators 116. The control system 110 may receive information, for example via controller 112, from a plurality of sensors 114 and send control signals to a plurality of actuators 116 based on the information received. The plurality of sensors 114 may include a plurality of position sensors, a plurality of a motor phase current sensors, and the like, as one example. As another example, the plurality of actuators 116 may include an electrical actuator to adjust speed and torque of the electric motor 102. The controller 112 may receive input data from the various sensors, process the input data, and control the actuators in response to the processed input data based on executable instruction or code programmed therein corresponding to one or more routines. The control system 110 may further include a control circuit in a plurality of circuits wherein the control circuit includes at least one transistor. In this way, the control circuit may be electrically coupled to the electric motor to apply pulse d-axis currents and the like.

The vehicle system 100 may derive propulsion power from the electric motor 102. The electric motor 102 may be a traction motor, an axial motor, and the like, as some examples. In the present disclosure, the electric motor 102 is mounted in a rear wheel drive configuration. Other embodiments of the present disclosure may utilize alternative configurations, such as employing electric motor 102 in a front wheel configuration or employing a configuration wherein the electric motor 102 is mounted to both the rear vehicle wheels 104 and the front vehicle wheels 106. The electric motor 102 may receive electrical power from a traction battery 108 to provide torque to rear vehicle wheels 104. In some embodiments, the electric motor 102 may be operated as a generator to provide electrical power to charge traction battery 108, for example, during a braking operation.

The electric motor 102 may include a gearbox integrated therein. Additionally or alternatively, the electric motor 102 may be coupled to an outside of a transmission/gearbox housing. The integrated gearbox may include a differential gear set and a planetary gear set for transmitting power from the electric motor 102 to the rear vehicle wheels 104. The electric motor 102 may also include at least one clutch. A controller in a designated control system (e.g., not including the control system 110) of the vehicle system 100 may send a signal to an actuator of the clutch to engage or disengage the clutch, so as to couple or decouple power transmission from the electric motor 102 to the rear vehicle wheels 104 or from the electric motor 102 to the front vehicle wheels 106. Additionally or alternatively, there may be multiple traction batteries configured to provide power to different driven wheels, wherein power to the wheels may be predicated based on traction at the wheels, driver demand, and other conditions. In one example, the vehicle system 100 includes an all-wheel drive vehicle system.

Similar to the control system 110, the designated control system described above may receive information from a plurality of sensors and send control signals to a plurality of actuators based on the information received. The plurality of sensors may include a battery level sensor, a clutch activation sensor, and the like, as one example. As another example, the plurality of actuators may include a clutch. The controller in the designated control system may receive input data from the various sensors, process the input data, and control the actuators in response to the processed input data based on executable instruction or code programmed therein corresponding to one or more routines.

Turning now to FIG. 2, it shows a motor and rotating system 200 of an electric motor 102. The electric motor 102 may include a rotor 202 and a stator 204. The rotor may comprise a plurality of sensors and a generally cylindrical rotor body including an inner surface and an outer surface wherein a plurality of magnets 206 is mounted to the inner surface of the rotor body. The stator 204 may comprise a hollow, cylindrical shape that surrounds an outer surface of the rotor 202 coupled to a rotor shaft 208 and a plurality of stator windings electrically coupled to a control circuit of a plurality of circuits including at least one transistor. In some embodiments, a gap may be arranged between the stator 204 and the rotor 202. A set of reference axes may include a d-axis 210 and a q-axis 212. Further, the d-axis 210 may be parallel to the flux linkage phasor of a permanent magnet of the plurality of magnets 206 of the electric motor 102. In this way, the d-axis may be parallel to the magnetization direction of the permanent magnet. When referencing direction, positive may refer to in the direction of the arrow of the d-axis 210 and q-axis 212 and negative may refer to in the opposite direction of the arrow of the d-axis 210 and q-axis 212. During operation of the electric motor 102, a direct current may be negative along the d-axis and a quadrature current may be positive along the q-axis.

A current control scheme may be applied to the electric motor 102 according to at least one of a maximum torque per amp (MTPA), flux weakening, and maximum torque per volt (MTPV). The d-axis current may be negative to oppose and reduce rotor magnetic flux of rotor 202 in current control schemes that utilize flux weakening and MTPV. In some cases, the plurality of permanent magnets may experience non-reversible demagnetization and flux linkage of the plurality of permanent magnets may not return to the nominal values according to motor design in response to removing a high negative current via the current control scheme.

The rotor 202 and the stator 204 may be concentric about a central axis. The rotor shaft 208 may extend in a direction parallel to the central axis. The rotor 202 may rotate about the central axis as the stator 204 remains stationary. The stator 204 may include end windings extending from a body therefrom. The stator 204 may include a plurality of slots 216 extending through a stator core of the stator 204. The plurality of slots 216 may receive one or more wires of a plurality of stator windings. In some embodiments, the plurality of stator windings may be an I shaped winding or a U-shaped winding. The plurality of stator windings may be electrically coupled to a control circuit in a plurality of circuits wherein the control circuit may include at least one transistor to apply pulse d-axis currents to magnetize the plurality of magnets 206. The plurality of stator windings may extend through the plurality of slots 216. In one example, the axial direction may be parallel to the central axis.

In one example, the stator 204 includes an inner surface 214 nearest to the rotor 202 and an outer surface 218 distal to the rotor 202. The plurality of slots 216 may traverse between the inner surface 214 and outer surface 218 toward the end surfaces of the stator 204. The plurality of slots 216 may be arranged in the stator core via additive manufacturing, injection molding, or other manufacturing technique, such as stack of stamp or cut electrical steel sheets. The plurality of windings may extend in a direction parallel to the slots, wherein winding ends may be connected to one another via welds or other connections. The plurality of slots may include electric wires (e.g., windings) arranged therein.

Each of the plurality of slots 216 may include two or more unique sections, characterized by their different widths. The width may be measured in a direction normal to each of the axial and radial directions. The plurality of slots 216 may be arranged adjacent to the inner surface 214. The inner surface 214 may include a circular cross-section and may be concentric with the rotor 202 about the central axis of rotor shaft 208. The inner surface 214 may be sealed except for a plurality of openings arranged therein corresponding to slot openings of the plurality of slots 216.

As illustrated in FIG. 3A and FIG. 3B, a magnetic flux density B curve with respect to an externally applied magnetic field strength H and a magnetic polarization curve J with respect to the externally applied magnetic field strength H. The curves 300 in FIG. 3A and the curves 301 in FIG. 3B illustrate temperature effects that may result in demagnetization of permanent magnets. During the process of magnetization, magnetic dipoles in a permanent magnet may align parallel to an external magnetic field that is applied to the permanent magnet. Saturation of polarization of the permanent magnet may be achieved once the magnetic dipoles are aligned with the external magnetic field. Increasing the external magnetic field strength to a value exceeding a saturation magnetic field strength does not increase polarization J of the permanent magnet.

The curves 300 of FIG. 3A and the curves 301 of FIG. 3B include a first curve 302 wherein the first curve 302 describes the relationship between magnetic polarization J (J-axis) and the externally applied magnetic field strength $H_{cJ}$ (H-axis). The curves 300 of FIG. 3A and the curves 301 of FIG. 3B also include a second curve 304 wherein the second curve 304 describes the relationship between magnetic flux density B (B-axis) and the externally applied magnetic field strength $H_{cB}$ (H-axis). As illustrated herein, polarization J increases as the externally applied magnetic field strength $H_{cJ}$ decreases. Similarly, magnetic flux density B increases as the externally applied magnetic field strength $H_{cB}$ increases.

The curves 300 of FIG. 3A and the curves 301 of FIG. 3B further include an operating curve 306 describing operating conditions of the electric motor (e.g., electric motor 102 of FIG. 1 and FIG. 2) during operation of the electric motor. As illustrated in FIG. 3A and FIG. 3B, the permanent magnet may be exposed to an external magnetic field in directional opposition of the magnetization of the permanent magnet. As such, the operating curve 306 decreases as the externally applied magnetic field decreases. The operating point during operation of the electric motor may be described as the intersection between the operating curve 306 and the magnetic flux density B curve (e.g., either the second curve 304 or a fourth curve 308).

Now turning to the curves 300 of FIG. 3A, it may be observed that the operating point during operation of the electric motor occurs where the operating curve 306 intersects the second curve 304 in a linear region of the magnetic flux density curve B (e.g., second curve 304). In this case, the permanent magnet does not experience demagnetization once the externally applied magnetic field is removed from the permanent magnet.

In the curves 301 of FIG. 3B, it may be observed that the operating point during operation of the electric motor occurs where the operating curve 306 intersects the second curve 304 in a curved region of the magnetic flux density curve B (e.g., second curve 304). In this case, the permanent magnet may experience irreversible losses in magnetization of the permanent magnet, decreasing the remanence magnetic field. As such, the irreversible losses in magnetization may be present when the externally applied magnetic field is applied or removed.

The curves 301 of FIG. 3B may further include a fourth curve 308 wherein the magnetic flux density B is decreased compared to the second curve 304 at the same externally applied magnetic field strength. In this case, the temperature of the permanent magnets increased resulting in movement of the $H_{cB}$ point closer to the B axis/J axis. The movement of the magnetic flux density curve is undesirable and may result in easier demagnetization of the permanent magnet.

Turning to FIG. 4, a method 400 for monitoring rotor flux linkage in a rotor of an electric motor via a monitoring mode and implementing remediation measures via a resetting mode. Rotor flux linkage in a rotor of the electric motor may be determined via a plurality of models, a plurality of sensors and/or executable instructions configured, stored, and executed in at least one memory by at least one processor of an inverter. Accordingly, the monitoring mode may be continuously executed at run-time without utilizing digital signal processing (DSP) or microcontroller units. The monitoring mode may be enabled during an operational mode of the motor wherein power is supplied during the operational mode to control motor speed and torque according to the system described herein. In this way, rotor flux linkage may be monitored continuously via the monitoring mode during the operational mode of the motor (e.g., run-time) and remediation measures may be implemented via the resetting mode in response to detecting a loss of magnetization of the rotor magnets within a pre-determined threshold during the monitoring mode.

At 402, the method 400 includes monitoring rotor flux linkage via the monitoring mode. Monitoring rotor flux linkage in a rotor of an electric motor includes measuring rotor flux linkage generated by rotor magnets at an air gap of the motor continuously during run-time. The rotor flux linkage generated by rotor magnets may be determined by modeling motor voltage in a d-axis of the rotor via a first model at steady state, modeling motor voltage in the q-axis of the rotor via a second model at steady state, modeling magnetic flux linkage of a rotor via a third model at steady state based on the first model and the second model, and calculating rotor flux linkage based on the third model via a plurality of parameters The d-axis voltage of the electric motor at steady state is expressed by the first model:

$$U_d = R \cdot I_d - \Omega_{me} \cdot L_q \cdot I_q \quad (1)$$

where $U_d$ is the d-axis voltage, R is the stator resistance, $I_d$ is the d-axis current, $I_q$ is the q-axis current, $\Omega_{me}$, is the field electrical speed, and $L_q$ is the q-axis inductance. The q-axis voltage of the electric motor at steady state is expressed by the second model:

$$U_q = R \cdot I_q + \Omega_{me} \cdot L_d \cdot I_d + \Omega_{me} \cdot \lambda_{mg} \quad (2)$$

where $U_q$ is the q-axis voltage, R is the stator resistance, $I_d$ is the d-axis current, $I_q$ is the q-axis current, $\Omega_{me}$, is the field electrical speed, $L_d$ is the d-axis inductance, $L_q$ is the q-axis inductance, and $\Lambda_{mg}$ is magnet flux linkage.

Rotor flux linkage appears in the term $\Omega_{me} \Lambda_{mg}$ in the second model. As illustrated above, rotor flux linkage is linearly proportional to the field electrical speed and contributes to the generation of q-axis voltage. Accordingly, flux linkage may be calculated by the third model:

$$\Lambda_{mg} = \frac{U_q - R \cdot I_q}{\Omega_{me}} - L_d \cdot I_d \quad (3)$$

where the model parameters are the same as described above. By utilizing the third model, rotor position, stator currents, and q-axis current, the flux linkage may be determined. Rotor position may be determined via a plurality of position sensors of the plurality of sensors and/or estimated via sensorless algorithms or executable instructions. Stator currents may be measured via motor phase current sensors.

A simplified third model of the third model may be utilized in response to a motor operating below a base speed and with from among one of no load or negligible load. At the aforementioned operating conditions, rotor flux linkage may be calculated via the simplified third model:

$$\Lambda_{mg} = \frac{U_q}{\Omega_{mg}} \quad (4)$$

The first model, the second model, the third model, and the simplified third model may be utilized to determine the actual value of the rotor flux linkage by indirect measurements of q-axis voltage. In some embodiments, the q-axis voltage, $U_q$, may be a control value (e.g., q-axis current output from a proportional integral (PI) controller) or measured from direct sensing circuitry of motor three phase voltages and calculated via Clarke and Park inverse transformations.

At 404, the method 400 includes determining whether rotor flux linkage is below a pre-determined threshold via the monitoring mode. The pre-determined threshold may be a percentage threshold determined based on a difference between a calculated value of rotor flux linkage and a nominal value of rotor flux linkage based on motor design. In one example, the percentage threshold may include comparing the calculated value of rotor flux linkage to the nominal value of the rotor flux linkage based on motor design and determining whether the calculated value is 10% below the nominal value. Other embodiments of the present disclosure may utilize alternative pre-determined thresholds and/or different percentage threshold values without departing from the scope of the present disclosure. If the rotor flux linkage is not below a pre-determined threshold, the method 400 includes not terminating the monitoring mode and not entering the resetting mode in response to the calculated rotor flux linkage being within the pre-determined threshold and monitoring rotor flux linkage via the monitoring mode at 402.

If the rotor flux linkage is below a pre-determined threshold, the method 400 includes terminating the monitoring mode and entering a resetting mode in response to the calculated rotor flux linkage not being within the pre-determined threshold and determining whether motor movement has ceased at 406 via the resetting mode. The resetting mode may comprise executable instructions configured, stored, and executed in at least one memory by at least one processor of an inverter. The resetting mode may include ensuring motor movement has ceased by monitoring motor speed via signals received from a plurality of sensors via the inverter in various embodiments prior to resetting rotor flux linkage in response to detecting motor movement has ceased (e.g., a motor speed of zero) of the present disclosure. The inverter may be communicatively coupled to the plurality of sensors, such as an encoder, wherein the absence of a signal from the encoder may indicate that motor movement has ceased (e.g., the motor speed of zero). Other types of sensors may transmit signals to the inverter to determine whether motor movement has ceased in other embodiments.

In some embodiments, including vehicle traction, motor movement ceases frequently during normal operation of the vehicle. In other embodiments, including industrial pumps, motor movement ceases at pre-determined times, such as during low workload (e.g., during night time or scheduled maintenance of equipment). By resetting rotor flux linkage during regularly occurring times or scheduled times wherein motor movement ceases, the operational mode may be maintained without stalling operation during run-time and utilizing user intervention in various applications. As such, degradation of motor performance during the operational mode may be decreased since remediation measures are implemented during a first time wherein motor movement ceases, minimizing the time wherein a vehicle operates at undesirable conditions. If motor movement has not ceased, the method 400 includes determining whether motor movement has ceased at 406 via the resetting mode until motor movement has ceased.

If motor movement has ceased, the method 400 includes resetting rotor flux linkage via the resetting mode at 408. The resetting mode may further include resetting rotor flux linkage according to the executable instructions configured, stored, and executed in at least one memory by at least one processor of the inverter. Resetting rotor flux linkage in response to the rotor flux linkage not being within the pre-determined threshold may include injecting a positive pulse d-axis current for a plurality of motor pole pairs when motor movement has ceased. A method for injecting the positive pulse d-axis current for a plurality of motor pole pairs is described further in FIG. 5. The magnetization process that results from injecting the positive pulse d-axis current over a short-time duration (e.g., a few second) may not affect operation of the system (e.g., the electric motor) as a result of the motor temporarily ceasing operation (e.g., lack of motor movement) and the short-time duration (e.g., quick magnetization process). The method 400 then returns.

The system and methods described herein are illustrative rather than absolute and do not limit the scope of the present disclosure. The method 400 described in FIG. 4 may be utilized for electric motors in vehicle applications and non-vehicle applications. In particular, the method 400 may be utilized in electric motors for traction drive systems, electric pumps, heating, ventilation, and air conditioning (HVAC), home appliances, and industrial equipment.

As illustrated in FIG. 5, a method 500 wherein rotor flux linkage may be reset to nominal values based on motor design via injecting a positive pulse d-axis current for a plurality of motor pole pairs. The positive pulse d-axis current is applied in the opposite direction of a typical operating mode of an electric motor (e.g., negative d-axis current). By setting an electrical angle for a pole pair of a plurality of pole pairs, setting a positive d-axis current value, and applying a current pulse to the pole pair of the plurality of pole pairs for all the pole pairs, a plurality of rotor magnets (e.g., ferrite magnets) that are experiencing demagnetization may be magnetized via the resetting mode.

At 502, the method 500 includes setting an initial electrical angle of a pole pair of a plurality of pole pairs. The initial electrical angle may be one electrical angle of a plurality of electrical angles. An initial rotor position may be determined by an absolute position sensor utilized in Field Oriented Control. In this way, the d-axis of the rotor may be identified via Clarke and Park transformations. Additionally, the initial rotor position may be determined via sensorless algorithms that utilize inductance measurements. The initial electrical angle may be set by identifying the position of a pole pair of the plurality of poles. One pole pair of the plurality of pole pairs comprises one ferrite magnet which includes a north pole and a south pole. The plurality of pole pairs is equally spaced on the inner surface of the rotor and therefore, each pole pair in the plurality of pole pairs may be identified based on the initial electrical angle and a pre-determined angle shift based on a physical space between the plurality of pole pairs. In particular, the plurality of pole pairs may be identified by the following equation:

$$\theta_i = \theta_0 + \frac{360°}{p} \cdot i \text{ with } i = 0...p-1 \quad (5)$$

where $\theta_1$ is an electrical angle of the pole pair, $\theta_0$ is the initial electrical angle, and p is the number of pole pairs in the plurality of pole pairs. The aforementioned equation may be utilized to determine a subsequent electrical angle of the plurality of electrical angles.

At 504, the method 500 includes setting a positive d-axis current, $I_d$, value. Setting the positive d-axis current, $I_d$, value may be based on rotor design and magnet dimension as defined by the motor designer. The value of the current pulse is selected to restore a saturation external magnetic field strength Hs, as described with respect to FIG. 3A and FIG. 3B. Selecting a higher current density does not result in higher magnetization values since the saturation external magnetic field strength Hs is a physical limit of the material of the plurality of magnets. At the saturation external magnetic field strength Hs, the magnetic dipoles of the plurality of magnets may be directionally oriented with the externally applied magnetic field.

At 506, the method 500 includes applying the current pulse to the pole pair of the plurality of pole pairs. An inverter that is electrically coupled to an electrical power source may supply electrical power to a stator with a plurality of stator windings wherein the plurality of stator windings may be electrically coupled to a control circuit of a plurality of circuits that includes at least one transistor may be utilized to apply positive pulse d-axis currents. Executable instructions configured, stored, and executed in at least one memory by at least one processor of the inverter may be utilized to apply the current pulse to the pole pair of the plurality of pole pairs via the system described above. The current pulse is applied for a pre-determined time duration to ensure magnetic dipoles of the plurality of magnets are aligned, effectively magnetizing the plurality of magnets and reducing degradation effects of motor performance due to demagnetization.

At 508, the method 500 includes determining whether all pole pairs of the plurality of pole pairs have been completed. As described herein, the executable instructions configured, stored, and executed in at least one memory by at least one processor of the inverter may be utilized to determine whether all pole pairs of the plurality of pole pairs have been completed. The inverter may be communicatively coupled to a plurality of sensors of the motors, including a plurality of position sensors that identify the rotor position and accordingly, the pole pair position based on the rotor position. In this way, the executable instructions may be configured to identify the final pole pair based on rotor position in some embodiments. Some embodiments may utilize alternative or additional components of the electric motor system than described herein to identify whether all the pole pairs of the plurality of pole pairs have been completed, magnetizing the demagnetized rotor magnets. The examples provided are illustrative rather than absolute and do not limit the scope of the present disclosure.

If not all the pole pairs of the plurality of pole pairs have been completed, the method 500 includes not terminating the resetting mode in response to not all the pole pairs in the plurality of pole pairs being magnetized and setting a subsequent electrical angle of a pole pair at 510. As described herein, the subsequent electrical angle of the pole pair may be determined by collecting rotor position data from a plurality of position sensors of the plurality of sensors. Once the subsequent electrical angle has been set, the positive d-axis current value of a subsequent pole pair that is different from the previous pole pair may be set based on rotor design and magnet dimensions. Further, the current pulse at the selected d-axis current value of may be applied to the subsequent pole pair via the inverter via the stator winding via the control circuit of the plurality of circuits via at least one transistor of the control circuit. If all the pole pairs of the plurality of pole pairs have been completed, the method 500 includes terminating the resetting mode and entering the monitoring mode before ending.

The system and methods described herein are illustrative rather than absolute and do not limit the scope of the present disclosure. The method 500 described in FIG. 5 may be utilized for electric motors in vehicle applications and non-vehicle applications. In particular, the method 500 may be utilized in electric motors for traction drive systems, electric pumps, heating, ventilation, and air conditioning (HVAC), home appliances, and industrial equipment, as some examples.

FIG. 6 illustrates a timing diagram 600 wherein changes in motor speed, current pulse, and magnetization/demagnetization of a plurality of pole pairs change with respect to time t during a monitoring mode and resetting mode of an electric vehicle. The timing diagram comprises a plurality of panels, such as motor speed 602, current pulse 604, an initial pole pair 606, a subsequent pole pair 608, and a final pole pair 610. It may be understood that the initial pole pair 606, the subsequent pole pair 608, and the final pole pair 610 are a subset of the plurality of pole pairs. The timing diagram 600 is limited to three pole pairs for the purpose of simplification but the methods and systems described herein are applied to all pole pairs in the plurality of pole pairs of the electric motor.

Motor speed 602 illustrates whether the value of the motor speed is either non-zero or zero at various points in time. Current pulse 604 illustrates whether the value of the current pulse applied to the d-axis of a rotor is negative or positive. A negative current pulse is applied during the monitoring mode and a positive current pulse is applied during the resetting mode. The negative current pulse is applied during run-time of the electric motor to initiate motor movement and continue motor movement during operation of a vehicle. However, applying the negative current pulse may result in loss of magnetization of a plurality of magnets. In contrast, the positive current pulse is applied when motor movement ceases to align magnetic dipoles in the plurality of magnets to magnetize the plurality of magnets in response to the plurality of magnets being demagnetized.

Each magnet in the plurality of magnets comprises a pole pair. As such, the initial pole pair 606, the subsequent pole pair 608, and the final pole pair 610 illustrate whether the corresponding pole pair is magnetized or demagnetized, respectively. With respect to FIG. 6, it may be understood that the plurality of magnets may not be completely demagnetized to be categorized as demagnetized. Similarly, the plurality of magnets may not be perfectly magnetized to be categorized as magnetized. In particular, the criteria for demagnetization may include the rotor flux linkage being below a pre-determined threshold whereas the criteria for magnetization may include the rotor flux linkage being above the pre-determined threshold as described herein with respect to FIG. 4. The terms demagnetized and magnetized are utilized for the purpose of simplification.

The motor speed 602 includes a first motor speed point 612, a second motor speed point 614, a third motor speed point 616, and a fourth motor speed point 618. The current pulse 604 includes a first current pulse point 620, a second current pulse point 622, a third current pulse point 624, and a fourth current pulse point 626. The initial pole pair 606 includes a first initial pole pair point 628, a second initial pole pair point 630, a third initial pole pair point 632, and a fourth initial pole pair point 634. The subsequent pole pair 608 includes a first subsequent pole pair point 636, a second subsequent pole pair point 638, a third subsequent pole pair point 640, and a fourth subsequent pole pair point 642. The final pole pair 610 includes a first final pole pair point 644, a second final pole pair point 646, a third final pole pair point 648, and a fourth final pole pair point 650.

At time t0, an electric motor is operating in the monitoring mode according to the method described in FIG. 4. During the monitoring mode, the first motor speed point 612 indicates that the motor speed 602 is non-zero and that the motor movement has not ceased. Accordingly, the first initial pole pair point 628, the first subsequent pole pair point 636, and the first final pole pair point 644 indicate that the plurality of pole pairs, and accordingly, the plurality of magnets is magnetized at time t0. As such, the monitoring mode is enabled and the resetting mode is disabled since the plurality of magnets is sufficiently magnetized (e.g., the rotor flux linkage is above the pre-determined threshold). This is further indicated by a negative value of the current pulse 604 being supplied to the motor at the first current pulse point 620.

The electric motor continues to operate in the monitoring mode during run-time until at time t1, a change in the electric motor system is identified. In particular, the values of second initial pole pair point 630, the second subsequent pole pair point 638, and the second final pole pair point 646 at t1 indicate that the plurality of magnets is sufficiently demagnetized (e.g., the rotor flux linkage is below the pre-determined threshold). As such, the monitoring mode may terminate and the resetting mode may be entered responsive to the rotor flux linkage being below the pre-determined threshold as described in FIG. 4. However, the motor speed at t1 indicates that motor movement has not ceased and a negative value of current pulse 604 continues to be supplied to the electric motor. Accordingly, the resetting mode delays injecting a positive pulse d-axis current for the plurality of pole pairs.

At t2, the second motor speed point 614 of motor speed 602 is at zero, indicating that motor movement has ceased. Subsequently, a positive pulse current is applied to the electric motor according to the method 500 of FIG. 5. In particular, the positive pulse current is applied to the initial pole pair 606 according to the methods and systems described herein. In this way, the magnetic dipoles of the initial pole pair are directionally oriented to magnetize the initial pole pair (e.g., a first ferrite magnet). Although the positive value of the current pulse 604 is applied to the rotor at t2, the resetting mode does not supply the positive value of current pulse 604 to either the subsequent pole pair 608, the final pole pair, and the remaining pole pairs in the plurality of pole pairs. Each pole pair is reset independently from the remaining pole pairs (e.g., one at a time).

At t3, the third initial pole pair point 632 indicates that the initial pole pair 606 is magnetized. As such, a positive value of the current pulse 604 continues to be supplied to the rotor of the electric motor and the motor speed 602 remains at zero, indicating that motor continues to cease motor movement. However, instead of the positive value of the current pulse 604 being supplied to the initial pole pair 606, the positive value of the current pulse 604 is supplied to the subsequent pole pair 608 of the plurality of pole pairs to align the magnetic dipoles and magnetize the pole pair (e.g., a second ferrite magnet).

At t4, the third subsequent pole pair point 640 indicates that the subsequent pole pair 608 is magnetized. As such, a positive value of the current pulse 604 continues to be supplied to the rotor of the electric motor and the motor speed 602 remains at zero, indicating that motor continues to cease motor movement. However, instead of the positive value of the current pulse 604 being supplied to the subsequent pole pair 608, the positive value of the current pulse 604 is supplied to the final pole pair 610 of the plurality of pole pairs to align the magnetic dipoles and magnetize the pole pair (e.g., a final ferrite magnet of the plurality of magnets).

At t5, the third final pole pair point 648 indicates that the final pole pair 610 is magnetized. As such, the resetting mode of the electric motor is terminated and the monitoring mode is enabled. Accordingly, the motor speed 602 changes from zero to non-zero at the third motor speed point 616 and a negative value of the current pulse 604 is supplied to the rotor of the electric motor at the third current pulse point 624, indicating that the motor, and thus the vehicle, may be in operation. The plurality of magnets is no longer demagnetized and operation of the electric motor continues without introducing degradation effects due to demagnetization of the plurality of magnets.

At time t, the monitoring mode is enabled and the resetting mode is disabled as indicated by a non-zero value at the fourth motor speed point 618, a negative value at the fourth current pulse point 626, and the fourth initial pole pair point 634, the fourth subsequent pole pair point 642, and the fourth final pole pair point 650 being magnetized. The electric motor may continue to operate in the monitoring mode and may not enter the resetting mode until the plurality of magnets are not sufficiently magnetized and the rotor flux linkage is below the pre-determined threshold. Accordingly, the electric motor may follow a similar procedure as described with respect to FIG. 6.

The technical effect of operating an electric motor of a vehicle in a monitoring mode to detect whether rotor flux linkage is below a pre-determined threshold and resetting mode to magnetize a plurality of magnets of a rotor, such as ferrite magnets, in response to the rotor flux linkage being below the pre-determined threshold is simpler rotor designs of a motor rotor comprising a plurality of low remanent flux density and low coercivity magnets may be utilized without increasing degradation effects of the motor, which may reduce costs associated with the rotor.

The disclosure also provides support for a method for a rotor of a motor, comprising: monitoring rotor flux linkage of the rotor via a monitoring mode, and resetting rotor flux linkage of the rotor in response to rotor flux linkage not being within a pre-determined threshold via a resetting mode. In a first example of the method, monitoring rotor flux linkage of the rotor via the monitoring mode comprises measuring rotor flux linkage generated by rotor magnets at an air gap of the motor continuously during run-time. In a second example of the method, optionally including the first example, measuring rotor flux linkage generated by rotor magnets at the air gap of the motor continuously during run-time comprises: modeling motor voltage in a d-axis of the rotor via a first model at steady state, modeling motor voltage in a q-axis of the rotor via a second model at steady state, modeling magnetic flux linkage of the rotor via a third model at steady state based on the first model and second model, and calculating rotor flux linkage based on the third model. In a third example of the method, optionally including one or both of the first and second examples, a plurality of parameters of each of the first model, the second model, and the third model comprise one or more of: a stator resistance R, a d-axis inductance $L_d$ and a q-axis inductance $L_q$, a d-axis current $I_d$ and a q-axis current $I_q$, a d-axis voltage $U_d$ and a q-axis voltage $U_q$, an electric field speed $\Omega_{me}$, and a magnet flux linkage $\wedge_{mg}$. In a fourth example of the method, optionally including one or more or each of the first through third examples, a simplified third model of the third model is utilized in response to the motor operating below a base speed and with from among one of no load or negligible load. In a fifth example of the method, optionally including one or more or each of the first through fourth examples, resetting rotor flux linkage of the rotor in response to rotor flux linkage not being within the pre-determined threshold via the resetting mode comprises: ensuring motor movement ceases, and injecting a positive pulse d-axis current for a plurality of motor pole pairs. In a sixth example of the method, optionally including one or more or each of the first through fifth examples, injecting the positive pulse d-axis current for the plurality of motor pole pairs comprises controlling d-axis current supplied to the motor via a control circuit of a plurality of circuits via at least one transistor. In a seventh example of the method, optionally including one or more or each of the first through sixth examples, the pre-determined threshold is a percentage threshold determined based on a difference between a calculated value of rotor flux linkage and a nominal value of rotor flux linkage based on motor design. In an eighth example of the method, optionally including one or more or each of the first through seventh examples, the monitoring mode further comprises monitoring the rotor during operation of a traction motor.

The disclosure also provides support for a method for a rotor of a motor, comprising: automatically resetting rotor flux linkage of the rotor via a resetting mode in response to detecting the rotor flux linkage below a pre-determined threshold during a monitoring mode. In a first example of the method, in the monitoring mode comprises: continuously measuring rotor flux linkage via a first model that determines d-axis voltage, a second model that determines a q-axis voltage, and a third model that determines magnet flux linkage to calculate rotor flux linkage during a run-time of the motor, comparing calculated rotor flux linkage to nominal rotor flux linkage to determine whether the calculated rotor flux linkage is within the pre-determined threshold during the run-time of the motor, terminating the monitoring mode and entering the resetting mode in response to the calculated rotor flux linkage not being within the pre-determined threshold, and not terminating the monitoring mode and not entering the resetting mode in response to the calculated rotor flux linkage being within the pre-determined threshold. In a second example of the method, optionally including the first example, rotor flux linkage is determined via rotor position and via stator currents and q-axis current and nominal flux linkage is based on motor design. In a third example of the method, optionally including one or both of the first and second examples, the resetting mode comprises: setting an initial electrical angle of a plurality of electrical angles of an initial pole pair of a plurality of pole pairs, setting a positive d-axis current value based on rotor design and magnet dimensions, applying a current pulse to the initial pole pair for a pre-determined time duration, setting a subsequent electrical angle of plurality of electrical angles of a subsequent pole pair of the plurality of pole pairs, setting the positive d-axis current value based on rotor design and magnet dimensions, applying the current pulse to the subsequent pole pair, not terminating the resetting mode in response to not all the pole pairs in the plurality of pole pairs being magnetized, and terminating the resetting mode and entering the monitoring mode in response to all the pole pairs in the plurality of pole pairs being magnetized. In a fourth example of the method, optionally including one or more or each of the first through third examples, a value of the current pulse is selected to restore a saturation external magnetic field strength Hs. In a fifth example of the method, optionally including one or more or each of the first through fourth examples, an electrical angle is based on the initial electrical angle and a pre-determined angle shift based on a physical space between the plurality of pole pairs.

The disclosure also provides support for a motor system, comprising: a rotor comprising a plurality of sensors and a generally cylindrical rotor body including an inner surface and an outer surface wherein a plurality of magnets is mounted to the inner surface of a rotor body, a stator with a plurality of stator windings electrically coupled to a control circuit of a plurality of circuits including a at least one transistor to apply pulse d-axis currents, and an inverter electrically coupled to an electrical power source wherein executable instructions are configured, stored, and executed in at least one memory by at least one processor of the inverter to monitor rotor flux linkage via a monitoring mode and to magnetize a plurality of pole pairs via a resetting mode. In a first example of the system, the plurality of pole pairs is equally spaced on the inner surface of the rotor body and one pole pair of the plurality of pole pairs comprises one ferrite magnet comprising a north pole and a south pole. In a second example of the system, optionally including the first example, executable instructions are configured, stored, and executed in at least one memory by at least one processor of the inverter to monitor rotor flux linkage via the monitoring mode comprises: calculating rotor flux linkage based on rotor position, stator currents, and q-axis current, and terminating the monitoring mode and entering the resetting mode. In a third example of the system, optionally including one or both of the first and second examples, rotor position is measured via at least one of a plurality of position sensors and executable instructions configured, stored, and executed in the inverter and wherein stator currents and q-axis current are measured via a plurality of motor phase current sensors. In a fourth example of the system, optionally including one or more or each of the first through third examples, executable instructions are configured, stored, and executed in at least one memory by at least one processor of the inverter to magnetize the plurality of pole pairs via the resetting mode comprises: collecting rotor position data from a plurality of position sensors of the plurality of sensors and setting an initial electrical angle of a plurality of electrical angles of an initial pole pair of the plurality of pole pairs based on the rotor position data, setting a positive d-axis current value based on rotor design and magnet dimensions, applying a current pulse to the initial pole pair for a pre-determined time duration via the inverter via a stator winding via the control circuit of the plurality of circuits via at least one transistor of the control circuit, collecting rotor position data from the plurality of position sensors of the plurality of sensors and setting a subsequent electrical angle of plurality of electrical angles of a subsequent pole pair of the plurality of pole pairs, setting the positive d-axis current value based on rotor design and magnet dimensions, applying the current pulse to the subsequent pole pair via the inverter via the stator winding via the control circuit of the plurality of circuits via the at least one transistor of the control circuit, and terminating the resetting mode and entering the monitoring mode.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the terms "approximately" and "substantially" are construed to mean plus or minus five percent of the range, unless otherwise specified.

The invention claimed is:

1. A method for operating a rotor of a motor, comprising:
monitoring rotor flux linkage of the rotor via a monitoring mode;
determining the rotor flux linkage of the rotor is not within a pre-determined threshold via the monitoring mode; and
resetting rotor flux linkage of the rotor in response to the rotor flux linkage not being within the pre-determined threshold via a resetting mode,
wherein the pre-determined threshold is a percentage threshold determined based on a difference between a calculated value of rotor flux linkage of the rotor and a nominal value of rotor flux linkage.

2. The method of claim 1, wherein monitoring rotor flux linkage of the rotor via the monitoring mode comprises measuring rotor flux linkage generated by rotor magnets at an air gap of the motor continuously during run-time.

3. The method of claim 2, wherein measuring rotor flux linkage generated by rotor magnets at the air gap of the motor continuously during run-time comprises:
modeling motor voltage in a d-axis of the rotor via a first model at steady state;
modeling motor voltage in a q-axis of the rotor via a second model at steady state;
modeling magnetic flux linkage of the rotor via a third model at steady state based on the first model and second model; and
calculating the value of the rotor flux linkage based on the third model.

4. The method of claim 3, wherein a plurality of parameters of each of the first model, the second model, and the third model comprise one or more of:
a stator resistance R;
a d-axis inductance $L_d$ and a q-axis inductance $L_q$;
a d-axis current $I_d$ and a q-axis current $I_q$;
a d-axis voltage $U_d$ and a q-axis voltage $U_q$;
an field electrical speeds $\Omega_{me}$; and
a magnet flux linkage $\Lambda_{mg}$.

5. The method of claim 2, wherein a simplified third model of the third model is utilized in response to the motor operating below a base speed and with from among one of no load or negligible load.

6. The method of claim 1, wherein resetting rotor flux linkage of the rotor in response to rotor flux linkage not being within the pre-determined threshold via the resetting mode comprises:
ensuring motor movement ceases; and
injecting a positive pulse d-axis current for a plurality of motor pole pairs.

7. The method of claim 6, wherein injecting the positive pulse d-axis current for the plurality of motor pole pairs comprises controlling d-axis current supplied to the motor via a control circuit of a plurality of circuits via at least one transistor.

8. The method of claim 1, wherein the nominal value of the rotor flux linkage is based on a type of the motor.

9. The method of claim 1, wherein the monitoring mode further comprises monitoring the rotor during operation of a traction motor.

10. A method for operating a rotor of a motor, comprising:
during a monitoring mode,
monitoring a rotor flux linkage;
determining the rotor flux linkage is below a pre-determined threshold; then,
during a resetting mode,
automatically resetting the rotor flux linkage of the rotor via the resetting mode in response to detecting the rotor flux linkage is below the pre-determined threshold during the monitoring mode.

11. The method of claim 10, wherein in the monitoring mode comprises:
continuously measuring rotor flux linkage via a first model that determines d-axis voltage, a second model that determines a q-axis voltage, and a third model that determines magnet flux linkage to calculate rotor flux linkage during a run-time of the motor;
comparing calculated rotor flux linkage to nominal rotor flux linkage to determine whether the calculated rotor flux linkage is within the pre-determined threshold during the run-time of the motor;
terminating the monitoring mode and entering the resetting mode in response to the calculated rotor flux linkage not being within the pre-determined threshold; and
not terminating the monitoring mode and not entering the resetting mode in response to the calculated rotor flux linkage being within the pre-determined threshold.

12. The method of claim 11, wherein rotor flux linkage is determined via rotor position and via stator currents and q-axis current and nominal flux linkage is based on a type of the motor.

13. The method of claim 10, wherein the resetting mode comprises:
setting an initial electrical angle of a plurality of electrical angles of an initial pole pair of a plurality of pole pairs;
setting a positive d-axis current value based on rotor design and magnet dimensions;
applying a current pulse to the initial pole pair for a pre-determined time duration;
setting a subsequent electrical angle of plurality of electrical angles of a subsequent pole pair of the plurality of pole pairs;
setting the positive d-axis current value based on rotor design and magnet dimensions;
applying the current pulse to the subsequent pole pair;
not terminating the resetting mode in response to not all the pole pairs in the plurality of pole pairs being magnetized; and
terminating the resetting mode and entering the monitoring mode in response to all the pole pairs in the plurality of pole pairs being magnetized.

14. The method of claim 13, wherein a value of the current pulse is selected to restore a saturation external magnetic field strength Hs.

15. The method of claim 13, wherein an electrical angle is based on the initial electrical angle and a pre-determined angle shift based on a physical space between the plurality of pole pairs.

16. The method of claim 10, further comprising:
detecting the rotor flux linkage is not below the pre-determined threshold during a further monitoring mode; and
responsive to determining the rotor flux linkage is not below the pre-determined threshold during the further monitoring mode, continuing to monitor the rotor flux linkage via the further monitoring mode without resetting the rotor flux linkage.

\* \* \* \* \*